United States Patent
Dierks et al.

(10) Patent No.: US 7,546,177 B2
(45) Date of Patent: Jun. 9, 2009

(54) AUTOMATED STATE ESTIMATION SYSTEM FOR CLUSTER TOOLS AND A METHOD OF OPERATING THE SAME

(75) Inventors: Ulrich Dierks, Dresden (DE); Hardy Schumacher, Schwarzheide (DE)

(73) Assignee: Advanced Micro Devices, Inc., Austin, TX (US)

( * ) Notice: Subject to any disclaimer, the term of this patent is extended or adjusted under 35 U.S.C. 154(b) by 127 days.

(21) Appl. No.: 11/535,327

(22) Filed: Sep. 26, 2006

(65) Prior Publication Data

US 2007/0156274 A1 Jul. 5, 2007

(30) Foreign Application Priority Data

Dec. 30, 2005 (DE) .................. 10 2005 063 132
Jan. 10, 2006 (DE) .................. 10 2006 001 257

(51) Int. Cl.
*G06F 19/00* (2006.01)
(52) U.S. Cl. ..................... 700/121; 700/108
(58) Field of Classification Search ............. 700/108, 700/111, 121
See application file for complete search history.

(56) References Cited

U.S. PATENT DOCUMENTS

| 5,914,879 | A | 6/1999 | Wang et al. |
|---|---|---|---|
| 6,256,550 | B1* | 7/2001 | Wu et al. ................ 700/121 |
| 6,724,404 | B1 | 4/2004 | Hann, Jr. et al. |
| 2004/0034555 | A1 | 2/2004 | Dismukes |
| 2004/0148047 | A1* | 7/2004 | Dismukes et al. ......... 700/100 |

OTHER PUBLICATIONS

International Search Report and Written Opinion mailed Jun. 5, 2007.

* cited by examiner

*Primary Examiner*—Ryan A Jarrett
(74) *Attorney, Agent, or Firm*—Williams, Morgan & Amerson

(57) ABSTRACT

By using weighted entity states for representing a state of a cluster tool, a highly efficient technique for the measurement and monitoring of cluster tool characteristics, such as reliability, availability and maintainability, is provided. For example, individual entities of the cluster tool may be weighted according to their capacity and corresponding entity states may be ranked in accordance with a predefined hierarchy structure, thereby enabling an efficient combination of weighted entity states so as to represent the cluster tool state.

10 Claims, 4 Drawing Sheets

AUTOMATED STATE ESTIMATION SYSTEM FOR CLUSTER TOOLS AND A METHOD OF OPERATING THE SAME

BACKGROUND OF THE INVENTION

1. Field of the Invention

Generally, the present invention relates to the field of fabricating integrated circuits, and, more particularly, to monitoring and measuring process tool characteristics of a process tool used for the fabrication of semiconductor devices or other microstructures.

2. Description of the Related Art

Today's global market forces manufacturers of mass products to offer high quality products at a low price. It is thus important to improve yield and process efficiency to minimize production costs. This holds especially true in the field of microstructure fabrication, for instance for manufacturing semiconductor devices, since, in this field, it is essential to combine cutting-edge technology with mass production techniques. It is, therefore, the goal of manufacturers of semiconductors, or generally of microstructures, to reduce the consumption of raw materials and consumables while at the same time improving process tool utilization. The latter aspect is especially important, since, in modern semiconductor facilities, equipment is required which is extremely cost intensive and represents the dominant part of the total production costs. At the same time, the process tools of a semiconductor facility have to be replaced more frequently compared to most other technical fields due to the rapid development of new products and processes, which may also demand correspondingly adapted process tools.

Integrated circuits are typically manufactured in automated or semi-automated facilities, thereby passing through a large number of process and metrology steps to complete the device. The number and the type of process steps and metrology steps a semiconductor device has to go through depends on the specifics of the semiconductor device to be fabricated. For instance, a sophisticated CPU requires several hundred process steps, each of which has to be carried out within specified process margins so as to fulfill the specifications for the device under consideration.

Consequently, a plurality of process tools operating on the basis of predefined process recipes substantially determine the throughput and yield of a semiconductor facility, wherein the individual reliability, availability and maintainability of the process tools has a significant influence on the overall yield and product quality. For this reason, it is of great importance for the semiconductor manufacturer to monitor and determine corresponding metrics that provide a measure for the performance of individual process tools, thereby also enabling tool suppliers to specifically improve software and hardware components of process tools on the basis of the data provided by the manufacturers. Since tool requirements may significantly depend on manufacturer-specific conditions, a plurality of industrial standards have been defined to provide a foundation for defining a common global set of semiconductor equipment requirements, thereby reducing company-specific requirements for production equipment while, on the supplier side, attention may be focused on improving process capabilities instead of maintaining many customer-specific products. Thus, a plurality of equipment-specific standards have been defined relating to the definition and measurement of equipment reliability, availability and maintainability (RAM) known under SEMI (Semiconductor Equipment and Materials Institute) E10, which establish a common language for measuring RAM performance in a typical environment encountered in a facility for fabricating microstructures, such as integrated circuits. The E10 standard, which is widely adopted by the industry to measure RAM performance of, for instance, process tools used in the semiconductor industry presently defines six basic tool states of a process state so as to categorize the tool condition at each time within a typical manufacturing environment:

(1) productive state (PRD)—specifying a regular operation of the process tool under consideration, that is, production runs and the like representing a period during which the process tool is performing its intended function;

(2) standby state (SBY)—that is, the process tool is available but not producing, i.e., this state represents a period in which the tool is not operated although it is in a condition to perform its intended function and the chemicals and facilities are available;

(3) engineering state (ENG)—that is, the process tool is available but engineering experiments are being run, such as process characterization, equipment evaluation and the like, thus the process tool is in a condition to perform its intended function and no tool or process problems exist;

(4) scheduled downtown state (SDT)—that is, a period during which the process tool is not available to perform its intended function due to planned downtime events, such as maintenance delay, production tests, preventative maintenance (PM), changing consumables, setup of process change, facilities related downtime and the like;

(5) unscheduled down time state—that is a period during which the process tool is not in a condition to perform its intended function due to unplanned downtime events, such as maintenance delay, repair, unforeseen change of consumables, out-of-specification inputs, unforeseen facilities-related downtime and the like; and (6) unscheduled state—that is, a period of non-scheduled time during which the process tool is not scheduled to be utilized in production, such as periods including off-line training, unworked shifts, weekends, holidays and the like.

Thus, based on these tool states, the total time of the process tool's "evolution" may be categorized, for instance in a non-scheduled time corresponding to the non-scheduled state and operations time corresponding to the states 1-5 as defined above. The operations time may then be divided into uptime and downtime, wherein the uptime may be further divided into engineering time and manufacturing time, wherein the latter includes a productive time and a standby time. Consequently, productive time, standby time and engineering time correspond to the states 1-3 defined above. On the other side, the downtime of the process tool may be divided into scheduled downtime and unscheduled downtime corresponding to the tool states 4 and 5 defined above.

Furthermore, appropriate metrics may be defined for the reliability, availability and maintainability (RAM) of a process tool in order to more completely monitor and measure the equipment behavior, which may then assist in providing information to the supplier and also enhancing productivity and process control. In this respect, tool reliability may be defined as the probability that the process tool under consideration will perform its intended function within stated conditions for a specified period of time. The tool availability may be defined as the number of hours in which the tool is producing plus the standby time divided by the total available hours, wherein the availability is typically expressed as a percentage. For example, 168−(facilities downtime+equipment downtime+engineering time+setup and test time)/168 hours×100.

Maintainability may be defined as the probability that the process tool will be retained in or restored to a condition in which it can perform its intended function within a specified period. For example, appropriate metrics for describing the reliability, availability and maintainability may include metrics such as mean time between interrupts (MTBI), mean time between failures (MTBF), mean time between assists (MTBA), mean time to repair (MTTR), uptime, downtime and utilization.

Consequently, great efforts are made during the operation of a semiconductor facility in quantitatively determining the behavior of the process tools, wherein automated data gathering techniques are typically used due to the high number of process tools producing a correspondingly high amount of process information. Recently, process tools have become more complex in that a process tool may include a plurality of functional modules or entities, referred to as cluster or cluster tool, which may operate in a parallel and/or sequential manner such that a product arriving at the cluster tool may be operated therein in a plurality of process paths, depending on the process recipe and the current tool state. The recipe may be understood as the computer program, rules, specifications, operations and procedures performed each time to produce a substrate that contains functional units. Consequently, a cluster tool recipe may be understood as a set of instructions for the processing of substrates through a sequence of integrated process modules or entities, wherein a process module may be understood as a functional unit of a process tool which may perform a specific operation and may communicate its individual process state to the environment, for instance to a manufacturing execution system (MES). Thus, the above-specified tool states may also correspond to each individual entity or process module, thereby considering each entity as an individual process tool.

Consequently, for equipment performance reporting, the entities forming a cluster tool may be tracked and monitored with respect to the independent E10 states defined above, while an assessment of the cluster tool as a whole is not provided. Therefore, it has been proposed to evaluate the state of a cluster tool as a series of systems in order to provide the ability for measuring the conventional E10 RAM metrics. In this approach, so-called intended process paths are defined and considered as separate entities, wherein the overall performance of the multi-path cluster tool is derived from the performance of the individual process paths. As previously stated, the states defined within the E10 standard may not allow handling multi-path cluster tools at an overall level but may be applied to the individual tool entities. Consequently, reliability, for instance in the form of mean time between failure (MTBF), availability, for instance in the form of operational uptime, and maintainability, for instance in the form of mean time to repair (MTTR), for the various tool entities may be calculated, wherein these metrics, however, do not provide a metric for the multi-path cluster tool as an entity itself.

With reference to FIGS. 1a-1b, the conventional technique for characterizing cluster tools on the basis of the E10 standard will be described in more detail. FIG. 1a schematically shows a cluster tool 150 comprising a plurality of entities 151 and 152, wherein the entities or modules 151 may represent transportation modules, such as load locks 151A, 151B for receiving substrates, while the entity 151C may represent an unload lock for outputting substrates processed by the process entities or modules 152, wherein, for instance, entities 152A and 152B may represent equivalent process chambers configured to perform substantially the same process, such as an etch process and the like, while a process entity 152C may be configured to perform a subsequent process, such as resist stripping, cleaning and the like. Consequently, a substrate arriving at the cluster tool 150 may be passed through the tool 150 according to a plurality of process paths, depending on tool-specific conditions, such as availability of one of the entities 151, 152, and the like. Each of the entities 151, 152 may be assessed on the basis of the states as defined above, wherein an assessment of the tool 150 as a whole may lead to less meaningful metrics, for instance when one of the process modules 152A, 152B is not capable of processing substrates for a specified time period, since in principle the cluster tool 150 would be considered as being productive at all times due to its capability of producing products on the basis of the remaining functional entity 152. Simultaneously, although being in a productive state, a failure may exist and may require equipment maintenance, thereby rendering the present definitions of uptime and downtime less effective for the cluster tool 150. As previously discussed, the cluster tool 150 may be divided into an aggregate of "virtual tools" by defining respective intended process paths for the cluster tool 150, wherein an automated state change data collection on entity level is typically required to effectively calculate RAM metrics for a multi-path cluster tool, such as the tool 150, especially if a plurality of tools having a more or less complex structure are used in a manufacturing environment. For the generic tool 150, two intended process paths may be defined such that the substrate arriving at the tool 150 may be handled by one of the load locks 151A, 151B and may be supplied to the entity 152A and subsequently to the entity 152C and may finally be output by the unload lock 151C. Similarly, a second process path may be defined by one of the load locks 151A, 151B, the module 152B, the module 152C and the unload lock 151C. The corresponding intended process paths may be identified as IPP1 and IPP2 and an operation uptime for the cluster tool 150 may be defined as follows: Operational uptime (multi-path cluster tool)=(Σuptime for all intended process paths)/((number of process paths)×(operations time, as defined above)))×100.

In order to determine the operation uptime, the availability of the respective intended process paths may be determined, which may be accomplished on the basis of a truth table, such as Table 1a.

TABLE 1a

| 151A | 151B | 152A | 152B | 152C | 151C | IPP 1 | IPP 2 |
|------|------|------|------|------|------|-------|-------|
| Up   | Up   | Up   | Up   | Up   | Up   | Up    | Up    |
| Down | Up   | Up   | Up   | Up   | Up   | Up    | Up    |
| Down | Down | Up   | Up   | Up   | Up   | Down  | Down  |
| Up   | Up   | Down | Up   | Up   | Up   | Down  | Up    |
| Up   | Up   | Up   | Down | Up   | Up   | Up    | Down  |
| Up   | Up   | Up   | Up   | Down | Up   | Down  | Down  |
| Up   | Up   | Up   | Up   | Up   | Down | Down  | Down  |

For reducing the complexity of the cluster tool 150 for assessing the RAM metrics, the availability of the transport system may be considered separately in a respective truth table:

TABLE 1b

| 151A | 151B | 151C | Transport 151 |
|------|------|------|---------------|
| Up   | Up   | Up   | Up            |
| Down | Up   | Up   | Up            |
| Up   | Down | Up   | Up            |
| Down | Down | Up   | Down          |
| Up   | Up   | Down | Down          |

Thus, as is evident from Table 1b, the transport system 151 is up when at least the unload lock 151C is up and at least one of the load locks 151A, 151B is up.

FIG. 1b schematically illustrates the cluster tool 150 when virtually separated into two process path entities IPP1 and IPP2, wherein the plurality of transportation modules or entities 151A, 151B, 151C are combined into an entity "transport" 151. Thus, on the basis of the tool 150 as illustrated in FIG. 1b, the availability of the tool 150 may be established on the basis of a truth table, which presents a combination of Tables 1b and 1b. Therefore, in Table 1c, the uptimes and downtimes of the respective entities IPP1 and IPP2, comprising the cluster tool 150 as configured in FIG. 1b, may be determined.

TABLE 1c

| 152A | 152B | 152C | 151 Transport | IPP 1 | IPP 2 |
|------|------|------|---------------|-------|-------|
| Up   | Up   | Up   | Up            | Up    | Up    |
| Up   | Up   | Up   | Up            | Up    | Up    |
| Up   | Up   | Up   | Down          | Down  | Down  |
| Down | Up   | Up   | Up            | Down  | Up    |
| Down | Down | Up   | Up            | Down  | Down  |
| Up   | Down | Up   | Up            | Up    | Down  |
| Up   | Up   | Down | Up            | Down  | Down  |
| Up   | Up   | Up   | Down          | Down  | Down  |

As is evident from Table 1c, three tool configurations may result in a corresponding uptime of the entity IPP1 and respective three tool configurations, which may differ from the former configurations, result in a corresponding operational uptime of the entity IPP2. Consequently, on the basis of Table 1c and by measuring the respective states of the entities 152 and the transport 151 with respect to their temporal progression, respective operational uptimes and downtimes for a specified time period may be calculated. Moreover, other availability metrics according to the E10 standard may be calculated from the correspondingly established Table 1c. For instance, for an operations time of 168 hours, the evaluation of respective measurement results of the individual entity states may result in an uptime of entity IPP1 of 100 hours while the uptime of the entity IPP2 may be 140 hours. From these exemplary numbers, the operational uptime of the tool 150 may be calculated according to the above-specified formula, thereby resulting in an operational uptime of 71.4%. Other metrics with respect to reliability, availability and maintainability may be calculated on the basis of the above-specified procedures. For example, the mean time before failure (MTBF) for the cluster tool 150 may be calculated as the sum of the productive time for all process entities, that is, the entities 152 divided by the sum of failures during the productive time for all entities including the transport system 151. For the above-identified uptimes of IPP1 and IPP2, the following operational behavior of the cluster tool 150 may be assumed:

Entity 151A may have 100 productive hours with one failure, thereby resulting in an MTBF of 100 hours.

Entity 151B may have 140 productive hours and one failure may be assumed, thereby resulting in an MTBF of 140 hours.

Entity 151C may have 140 productive hours, since IPP2 has 140 hours uptime as specified above, and two failures are assumed, thereby resulting in an MTBF of 70 hours.

The transport system 151 may have one failure, thereby resulting in an MTBF of 140 hours.

Based on the above-given formula, the MTBF of the total cluster tool 150 may yield 380 hours/5 failures=76 hours.

Consequently, RAM metrics for the cluster tool 150 may be obtained on the basis of a configuration including respective intended process paths, which may be considered as tool entities and which may be in an up or down state, wherein the corresponding state may be identified on the basis of the status of the individual entities when referring to the truth tables as established above. In the above-described measurement technique for evaluating the state of a cluster tool, some issues may arise when applying the above-specified technique to the production environment including a variety of complex cluster tools, since the measurement results received by the above-specified technique may result in a reduced accuracy and thus confidence for the assessment of respective cluster tool states. For example, in the above-specified technique for assessing the tool state of a cluster tool in its entirety, the reconfiguration of a relatively purely performing cluster tool by adding high reliable entities, such as pass through chambers and the like, would significantly increase the MTBF value, thereby indicating an increased reliability, which may, however, be unrealistic. Furthermore, the corresponding metrics received by the above-specified technique may be less accurate when respective process entities, such as the entities 151A, 151B performing equivalent processes, are substantially identical so as to exhibit substantially the same performance. Furthermore, the MTBF value obtained for the cluster tool as a single entity is different from a corresponding value obtained by using the uptime of the cluster tool divided by the number of failures. Similarly, the MTTR (mean time to repair) value calculated from the mean time between failure and downtime differs from the downtime divided by the number of failures. It appears that the MTBF value and the MTTR value may be unrealistic values for the above-specified example, since 168 hours divided by the sum of 76 hours and 24.8 hours representing the mean time between failure and the mean time to repair, respectively, yields approximately 1.7 failure plus repair events per week for the cluster tool 150 in its entirety, wherein solely the entity 152C had already two failures and repairs per week, thereby causing 100% downtime to the entire cluster tool 150. As a consequence, the measurement of cluster tool characteristics, such as reliability, availability and maintainability according to conventional techniques may yield less reliable results, thereby significantly affecting production control in a semiconductor facility.

In view of the situation described above, there exists a need for an enhanced technique for assessing cluster tools, in which one or more of the problems identified above may be avoided or the effects thereof at least significantly be reduced.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a technique that enables efficient measurement and assessment of cluster tool characteristics, such as reliability, availability and maintainability. on the basis of a plurality of different states of at least some of the entities comprising the respective cluster tool. For this purpose, "combined" states for the cluster tool as an entity may be defined, wherein the corresponding states of the individual entities may represent sub-states, the various contributions of which determine the total state of the cluster tool. In order to appropriately combine the individual sub-states into a total state, appropriate weighting or normalization factors may be established, which substantially determine the influence of specific sub-states on the total cluster tool state. In some illustrative embodiments, a hierarchy may be established for the plurality of sub-states, i.e., for the individual states each entity of the cluster tool may take on, in order to establish a corresponding ranking in which one state may overrule other states in a sequence of states within the cluster tool. Consequently, due to the combination of a plurality of sub-states, the total state of the cluster tool when considered as an entity may be monitored and measured in a more accurate and reliable fashion, thereby providing a reliable basis for determining other tool-specific metrics, wherein, in some illustrative embodiments, corresponding measurement values may be obtained that are immediately comparable with corresponding measurement results for single process tools, thereby addressing aspects with respect to measurement against availability commitments of suppliers and providing a basis for data enabling a statement with respect to tool capacity.

According to one illustrative embodiment of the present invention, a system comprises an interface configured to receive process messages from a cluster tool having two or more entities, wherein the process messages are related to each of the entities. The system further comprises a state estimation unit connected to the interface and configured to automatically determine a metric for at least one of reliability, availability and maintainability of the cluster tool on the basis of the process messages and a functional capacity of each entity of the cluster tool.

According to another illustrative embodiment of the present invention, a method comprises receiving process messages from a cluster tool used in a manufacturing process line via an interface that communicates with the cluster tool, which comprises a plurality of entities. The method further comprises determining a metric for a current total state of the cluster tool on the basis of a functional capacity of each entity and on the basis of the process messages.

According to yet another illustrative embodiment of the present invention, a method of measuring a state of a cluster tool comprises receiving process messages from each of a plurality of entities of the cluster tool and determining a current entity state for each of the entities on the basis of the process messages, wherein the current entity states of the plurality of entities represent one of a plurality of available entity states. The method further comprises determining a set of weighted metrics on the basis of a predefined hierarchy of the plurality of available entity states as a measure of the state of the cluster tool, wherein each of the weighted metrics is associated with one of the plurality of available entity states.

BRIEF DESCRIPTION OF THE DRAWINGS

The invention may be understood by reference to the following description taken in conjunction with the accompanying drawings, in which like reference numerals identify like elements, and in which.

Figure 1A:
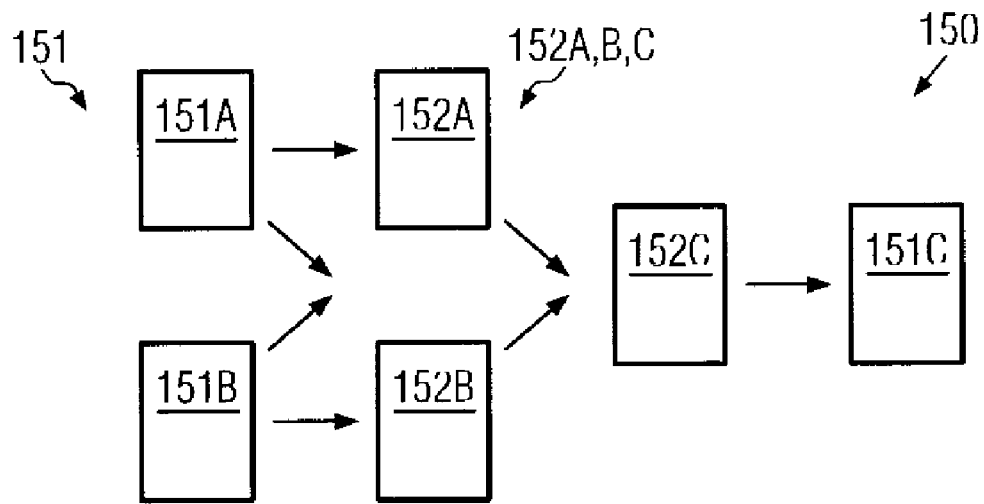
FIG. 1a schematically illustrates a cluster tool having a plurality of functional entities or process modules and transport modules.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention provides an enhanced technique for monitoring and measuring cluster tool characteristics, wherein, in some illustrative embodiments, the state of a cluster tool may be quantitatively estimated in terms of sub-states, which may be identical to corresponding process states of single process tools, thereby enabling a common treatment of cluster tools and single tools in a complex manufacturing environment. Consequently, the state of the cluster tool may be represented as a combination of weighted or normalized sub-states, wherein the number of sub-states may be selected in accordance with system requirements. Thus, in some illustrative embodiments, the sub-states may be selected as standard single process tool states, for instance corresponding to the E10 standard of SEMI, while nevertheless the technique provides the potential for reducing or increasing the number of sub-states depending on the current company-specific requirements. Consequently, contrary to conventional approaches in which, for instance, only two sub-states, i.e., up and down, are available for estimating a total state of a respective cluster tool, while nevertheless requiring highly complex truth tables, the present invention provides the potential for representing the cluster tool state on the basis of any desired number of sub-states, wherein all independent states of the individual entities are combined to give a representative picture of the performance of the entire cluster tool. Consequently, the state of the cluster tool may represent a mixture of the individual sub-states, wherein the influence of the individual sub-states, i.e., the independent states of the individual entities, may be appropriately weighted or normalized by a tool-specific weighting scheme, which in one particular embodiment is accomplished by a capacity weighted scheme. Consequently, clusters of entities and individual entities may be treated equally using the E10 standards and appropriate measurement results may be obtained with respect to corresponding supplier specifications, wherein the tool capacity may be handled in a form like: capacity (substrates/week)=168 (hours/week)×utilization (percent)×throughput rate (substrates/hours).

If, for instance, the determination of cluster tool characteristics on the basis of the E10 standard would be based on the availability of the mainframe of the cluster tool only, a parallel chamber failure will be identified by a decrease of the throughput rate, which may make it difficult to blame the supplier, since various other parameters affect the value of the throughput rate, such as recipe specifics, cascading of processes and the like. By way of example, a cluster tool comprising, for example, four chambers in parallel will have an excellent availability of the mainframe since it is able to work as long as at least one chamber is operational, while the throughput rate is affected by chamber failures. As chamber failures are counted as detractors to availability of the cluster tool, the performance may now be measured by a contracted and traceable metric. Moreover, as the throughput rate, that is, the numbers of processed substrates per productive hours and as the productive hours are reduced by a chamber failure in the same magnitude as the capacity loss caused by the chamber failure, the throughput rate of the cluster tool will remain substantially unaffected when the tool characterization is based on the tool capacity, thereby significantly facilitating the capacity measurement since the throughput rate is now a parameter independent from availability and utilization limit. Consequently, an enhanced availability of tool-specific characteristics compared to process-specific characteristics may be achieved according to the present invention compared to the conventional approach, thereby significantly improving the measurement efficiency of cluster tool reliability, availability and maintainability.

Figure 2A:
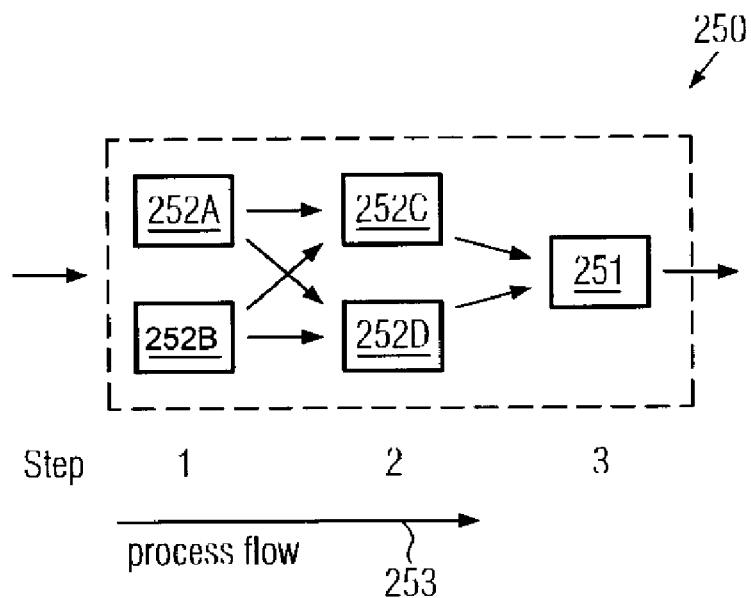
FIG. 2a schematically illustrates a cluster tool including a plurality of entities organized in various process steps with the mainframe representing the last process step in accordance with illustrative embodiments of the present invention.

With reference to FIGS. 2a-2f, further illustrative embodiments of the present invention will be described in more detail. FIG. 2a schematically represents a cluster tool 250 having a plurality of entities 252, 251, wherein the entities 252 may represent process modules for operating on substrates, such as etch chambers, polishing chambers and the like, while the entity 251 may represent a plurality of transport modules, thereby representing the mainframe of the cluster tool 250, i.e., the platform for receiving and releasing substrates. The cluster tool 250 may thus comprise entities 252A and 252B, which may be considered as substantially equivalent process chambers such that the entities 252A and 252B may be considered as parallel modules having substantially the same performance or capacity. Similarly, the entities 252C and 252D may be considered as equivalent modules or parallel modules having substantially the same capacity. It should be appreciated that the assumption of the same capacity or performance of parallel entities, such as the entities 252A, 252B or 252C, 252D is not essential to the present invention and a corresponding weighting scheme, as will be described in more detail later on, may take into consideration an appropriate asymmetry between parallel entities. Since respective parallel entities, such as the entities 252A, 252B and 252C, 252D produce substantially the same process output and the entities 252C, 252D operate on substrates preprocessed by the entities 252A, 252B, a corresponding process flow may be defined, as is illustrated by the arrow 253, wherein step 1 may represent a first step of the process flow 253, which in turn is defined by a corresponding process recipe. Similarly, step 2 may represent the process output created by the respective entities 252C, 252D, while step 3 of the process flow 253 may be represented by all transportation and substrate handling activities, which may not contribute to changes of substrate configuration, except for any defects created during the substrate handling processes. Step 3 representing the transport and wafer handling of the cluster tool 250, which may also be considered as the mainframe of the cluster tool 250, may in one illustrative embodiment be set as the last step of the process flow 253, thereby providing enhanced visibility of the number of process steps associated with a respective cluster tool.

Since each of the entities 252 and 251 may be in one of a plurality of predefined entity states, which may be considered as sub-states of the cluster tool when taken as a single entity, the cluster tool 250 may therefore be considered as being in a combination of a plurality of sub-states and, hence, according to the present invention, the influence of the various sub-states may be weighted by assigning corresponding weighting factors to each of the entities 252, 251 so as to obtain an appropriate overall state of the cluster tool 250. In one illustrative embodiment, the weighting or normalization of the individual entities 252, 251 is performed on the basis of the respective capacities of these entities, wherein an appropriate reference is selected for the cluster tool 250. In one illustrative embodiment, the reference capacity is selected as the minimum capacity of all steps defined in the cluster tool 250. The corresponding minimum capacity is then set to 100% capacity of the cluster tool 250. For example, with the cluster tool 250, the following performance data for the individual entities 252, 251 may have been established on the basis of supplier information, test runs, an average of operation data and the like, wherein the corresponding performance data may refer to specified process conditions:

Entity 252A: process time 140 seconds per cycle; process size 1 substrate per cycle;

Entity 252B: process time 140 seconds per cycle; process size 1 substrate per cycle;

Entity 252C: process time 100 seconds per cycle; process size 1 substrate per cycle;

Entity 252D: process time 100 seconds per cycle; process size 1 substrate per cycle; and Entity 251: process time 60 seconds per cycle; process size 1 substrate per cycle.

Consequently, entities 252A, 252B of the first step may (theoretically) produce one substrate in 70 seconds, while the entities 252C, 252D may produce a substrate every 50 seconds, and the entity 251 may handle a substrate every 60 seconds. Consequently, step 1 represents the "bottleneck" step in the cluster tool 250 and may be used as a reference indicating the 100% capacity of the tool 250. Consequently, each of the entities 252A, 252B has 50% capacity, while step 2 has a capacity of 140% yielding 70% capacity for each of the entities 252C, 252D. Finally, the entity 251 has a capacity of 117%. From the corresponding process times and process sizes specified above, corresponding throughput rates in substrates per hour may be calculated, which is 51.4 for the throughput rate of step 1, 72.0 for the throughput rate of step 2, and 60.0 for the throughput rate of step 3, thereby resulting in a throughput rate of 51.4 for the tool 250, since as specified above for the capacity, the throughput rate is defined by the "bottleneck" step 1 having a throughput rate of 51.4 substrates per hour. From the capacity data provided above, a respective setup matrix may be obtained, specifying the capacity of each entity and its position within the process flow 253. Table 2a illustrates the corresponding setup matrix of the tool 250.

TABLE 2a

| Cluster tool | Entity | Main | Step | cap % |
|---|---|---|---|---|
| 250 | 251 | 251 | 3 | 117% |
| 250 | 252A | | 1 | 50% |
| 250 | 252B | | 1 | 50% |
| 250 | 252C | | 2 | 70% |
| 250 | 252D | | 2 | 70% |

The setup matrix as represented by Table 2a may be used as a basis for the calculation of tool characteristics, for instance on the basis of the E10 standard, wherein the cluster tool 250 may frequently be in a mixture of a plurality of sub-states for a distinct time period, wherein the sum of all state times is the total time of the specified time period. For example, the entities 252A, 252B and 252C as well as the entity 251 may be productive for one hour, whereas the entity 252D may be in a state "unscheduled downtime (UDT)," thereby resulting in a cluster tool state for this time period of 70% (42 minutes) productive (PRD) and 30% (18 minutes) UDT since entity 252 having a weighting factor of 70% may reduce the corresponding step capacity, i.e., 140% to 70%, thereby reducing the productive time or capacity from 100% to 70% during the specified time period. It should be appreciated that the setup matrix as represented by Table 2a may be established for any tool configuration of the cluster tool 250 and may be especially established for any configuration in which parallel tool entities in the various steps of the process flow 253 may have different weighting factors, i.e., in the above-illustrated embodiment, different capacities. Moreover, in some illustrative embodiments, the weighting factors may be based on capacity data obtained by a weighted average of all operations for a specified entity or on the basis of correspondingly designed operations. In still other embodiments, the corresponding weighting factors, i.e., capacities in the above-described embodiment, may be dynamically adapted to specific process conditions. For instance, the corresponding cycle times for the various entities in different steps may significantly change when a different process recipe is to be used in the cluster tool 250. Consequently, the respective cycle time may be dynamically updated so that a corresponding tool characteristic may be monitored for specific process conditions. In this case, a process-dependent reliability, availability and maintainability may be measured, which may provide valuable company internal information with respect to yield analysis, tool utilization and the like. In still other illustrative embodiments, the respective weighting factors may be selected and processed independently, for instance by averaging the cycle times for all operations performed in a respective cluster tool, wherein a corresponding weighting may be performed on the basis of the frequency of specific operations and the like. In still other illustrative embodiments, supplier-provided operational data for the performance of the individual entities may be used, thereby achieving a high correspondence between software and hardware related characteristics of the entities substantially without any process-specific influences.

In order to establish a representative mixture of states used for evaluating the individual entities, for the cluster tool 250 as an entity, in one particular embodiment, a hierarchy of the plurality of states or sub-states may be established, wherein higher ranked states may have the ability of "overruling" lower ranked states, as will be described in more detail later on. In one representative embodiment, the E10 standard states used for single process tools or entities may be used as a plurality of appropriate sub-states in defining a mixture or combination for providing a metric for a corresponding cluster tool.

Table 2b represents a corresponding hierarchy for the six E10 states, wherein the non-scheduled state (NST) has the highest priority, followed by the unscheduled downtime state (UDT), the schedule downtime state (SDT), the engineering state (ENG), the standby state (SBY) and the productive state (PRD).

TABLE 2b

| RANK | STATE |
|---|---|
| 1 | NST |
| 2 | UDT |
| 3 | SDT |
| 4 | ENG |
| 5 | SBY |
| 6 | PRD |

For example, for two sequential steps, such as step 1 and step 2 of the cluster tool 250, step 1 may be 100% UDT, while step 2 may be 100% SDT. According to the ranking as illustrated in Table 2b, the cluster tool is then 100% UDT, since the UDT state overrules the SDT state.

Figure 2B:
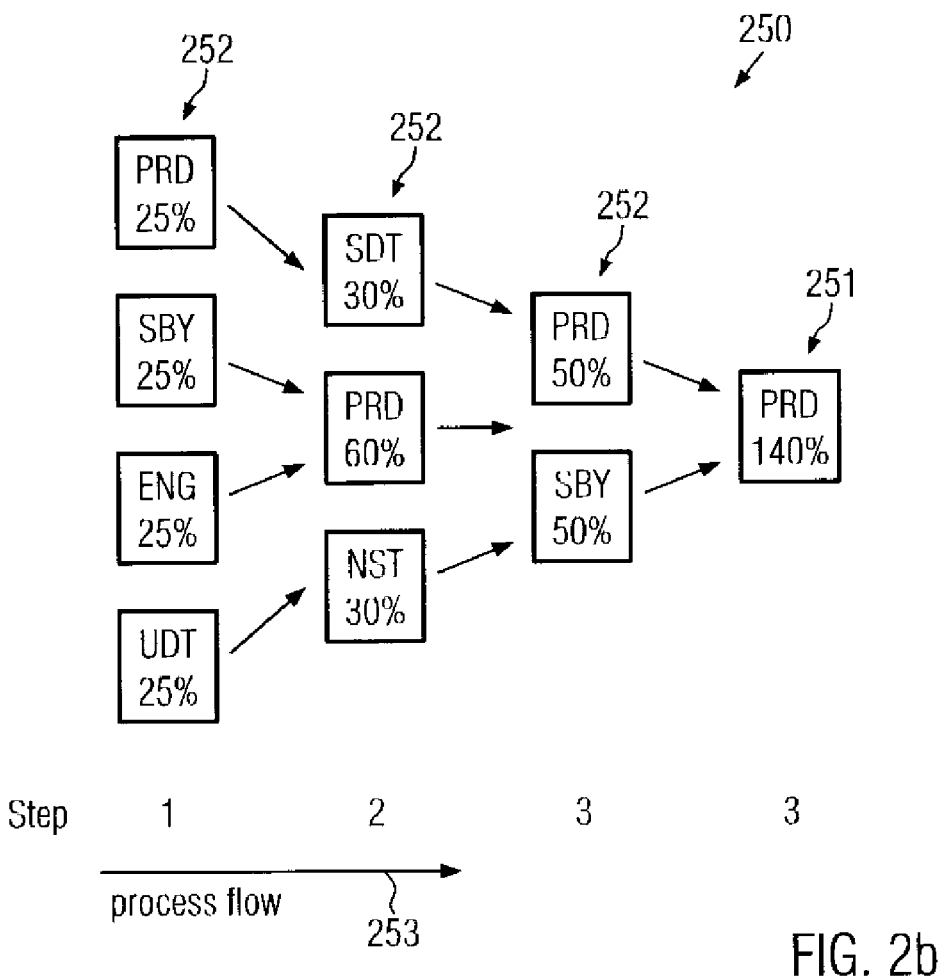
FIG. 2b schematically illustrates a cluster tool including a plurality of capacity weighted entities according to one illustrative embodiment of the present invention.

FIG. 2b shematically shows the cluster tool 250 in a different configuration, for instance including nine processing entities 252 and a corresponding mainframe or transport and substrate handling entity 251. The corresponding process flow as indicated by the arrow may, for instance, comprise three operational steps and the mainframe or substrate handling step as the last step, according to one illustrative embodiment as discussed above. Moreover, the individual entities 252 belonging to the first step may have substantially the same operational performance, wherein the entirety of the process entities 252 of the first step may represent 100% of the total capacity of the tool 250. Thus, each entity 252 in the first step is assigned the same weighting factor or capacity of 25%. Furthermore, the plurality of entities 252 belonging to the second step may represent 120% of the total capacity of the tool 250, wherein the various entities of the second step, although operating in parallel, may have different weighting factors or capacities, i.e., 30%, 60% and 30%. The entities 252 belonging to the third step may be assumed to have the same performance characteristic and may also represent 100% of the capacity of the cluster tool 250. Hence, in the third step, each entity is assigned 50%. Finally, the mainframe or transport and handling entity 251 may have a weighting factor or capacity representing 140% of the total capacity. It should be appreciated that the corresponding weighting factors or capacities may have been established on the basis of the same criteria as previously explained with reference to the setup matrix shown in Table 2a. Moreover, it may be assumed that the cluster tool 250 is in an operational state at a given point in time, which is determined by the individual states of the entities 252 and 251. In this example, for instance, the entities 252 belonging to the first step may be in the state PRD, SBY, ENG and UDT, respectively, while the corresponding entities 252 at this point in time may be in the states SDT, PRD and NST, respectively. Similarly, the entities 252 belonging to the third step may be in the respective states PRD and SBY, while the entity 251 is in the state PRD. Since, in this example, the state of the cluster tool 250 is to be determined as a mixture of the six E10 states, the corresponding ranking as defined in Table 2b may be used in estimating the influence of the various states on the overall state of the cluster tool 250. For example, the state having the highest rank or highest priority, i.e., the non-scheduled state (NST), is represented in the cluster tool 250 in the second step and has been detected in an entity 252 having a weight of 30%, wherein step 2 has a total weight of 120%. Consequently, the NST state "leaves" 90% of the entire tool capacity for other states, thereby imparting an influence of 10% to the overall tool state of the tool 250. Similarly, the unscheduled down state (UDT), which is overruled by the NST state, while overruling any other state is detected in an entity of the first step having a weight or capacity of 250%. Consequently, the UDT state may leave only 75% to any lower ranked states. Since already a reduced capacity of 90% is available due to the higher ranked SDT state, the influence of the SDT state may be set to 15%, i.e., the difference between 90% and 75%.

A scheduled down state (SDT) is encountered in the second step having a weighting factor or capacity of 30% since in this step a higher ranked NST state is also present with a weighting factor of 30%, the second step including the SDT state may leave only 60% of the total capacity, since the overall capacity of the second step is 120%. Consequently, the influence of the SDT state on the overall state of the tool 250 may be 15%, since the higher ranked UDT state already resulted in a reduced capacity of 75%. Similarly, an engineering state (ENG) may have been detected in an entity of the first step, thereby leaving only 50% for any lower ranked state. Thus, an influence of the ENG state on the overall state of the tool 250 may be 10%, as only 60% have been left so far by the higher ranked states. Furthermore, the standby state (SBY) is encountered in one entity 252 in the first step and in one entity 252 in the third step, wherein the SBY state in the first step, due to the presence of corresponding higher ranked states, may leave, in combination with these higher ranked states, only 25% for any lower ranked states, thereby overruling any lower ranked states. Hence, the influence of the SBY state to the overall state is 25% as only 50% have been left by any higher ranked states as is determined in the step before. Finally, the productive state (PRD) although encountered in a variety of entities 252 and 251 with higher weighting factor or capacity is determined by the entity of step 1, thereby resulting in an influence of 25% of the PRD state on the overall state of the tool 250. Consequently, on the basis of the corresponding hierarchy as represented by, for instance, Table 2a, a corresponding contribution of the individual states or sub-states on the overall state of the cluster tool 250 may be determined. It should be appreciated that the corresponding ranking of Table 2a may, in other illustrative embodiments, be altered in accordance with other criteria, such as company-specific requirements, or may be appropriately adapted if less or more individual states for each entity 252 and 251 are to be used. For example, if one of the states specified above is to be divided into two or more sub-states so as to provide an enhanced "state resolution," a corresponding ranking of the respective sub-states may be appropriately established. On the basis of the setup matrix as represented by Table 2a and a corresponding hierarchy as represented by Table 2b, in some illustrative embodiments, a corresponding determination of the total states may be performed, as will be described in more detail with reference to FIG. 2c.

Figure 2C:
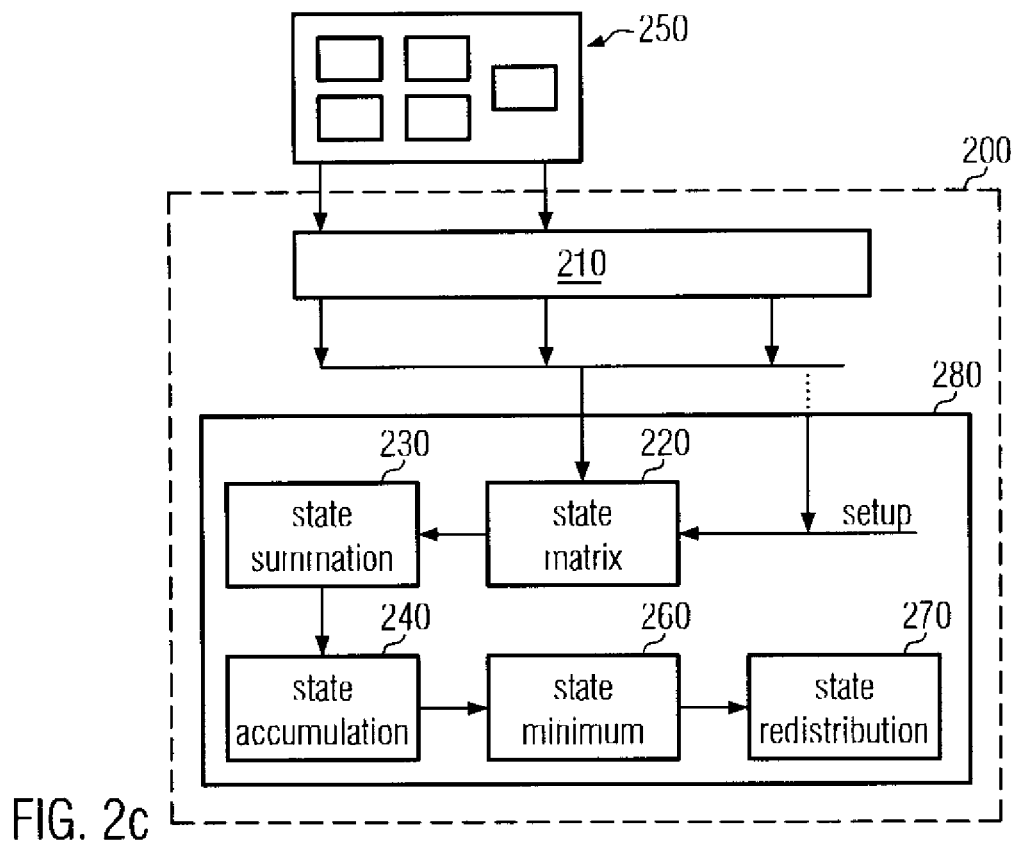
FIG. 2c schematically depicts a system for measuring cluster tool characteristics in accordance with illustrative embodiments of the present invention.

FIG. 2c schematically illustrates a system 200 configured to monitor and measure the state of a cluster tool and any metrics with respect to reliability, availability and maintainability of the cluster tool. In the representative embodiment shown in FIG. 2c, the cluster tool may be represented by the cluster tool 250 as shown in FIG. 2b, which also has the same configuration at a given point in time as is also shown in FIG. 2b. The system 200 may comprise an interface 210 that is configured to communicate with the cluster tool 250 to receive therefrom any process messages which at least relate to the individual states of the entities 252 and 251 of the tool 250, wherein the corresponding process messages may be obtained at least within specified time slots to provide a desired temporal resolution in order to reliably detect any state changes of each of the entities 252 and 251 of the cluster tool 250. Thus, the interface 210 is configured to obtain corresponding process messages with a frequency that enables the detection of any state changes within a time period that is appropriate for reliably assessing tool states. For instance, a time resolution of several seconds to a few minutes or even hours may be considered appropriate, in some illustrative embodiments, for obtaining respective updated process messages indicating the respective current states of each entity of the tool 250. The system 200 further comprises a state estimation unit 280, which is connected to the interface 210, for receiving state data related to the plurality of entities 252 and 251 of the tool 250, wherein the respective state data may be provided in any appropriate format so as to enable the state estimation unit 280 to further manipulate the respective state data for providing a metric of a total state of the tool 250 on the basis of a corresponding set of substrates, i.e., the states the individual entities 252, 251 may take on in the tool 250.

In one illustrative embodiment, the state estimation unit 280 may comprise a state matrix determination unit 220 which may receive any state data from the interface 210 and which may also receive setup data, which may be provided by the interface 210 or by any other external or internal source of the state estimation unit 280. The unit 220 may be configured to establish a corresponding current state matrix for a given point in time or a time slot on the basis of the setup data and the process messages received by the interface 210 from the tool 250. For the exemplary cluster tool 250 as described with reference to FIG. 2b, the corresponding state matrix may include the information as illustrated in Table 2c, which contains the respective states for each step of the cluster tools 250 in combination with the respective weighting factors or capacities as is explained with reference to FIG. 2b.

TABLE 2c

| STEP State | 1 cap % | STEP State | 2 cap % | STEP State | 3 cap % | STEP State | 4 cap % |
|---|---|---|---|---|---|---|---|
| PRD | 25% | SDT | 30% | PRD | 50% | PRD | 140% |
| SBY | 25% | PRD | 60% | SBY | 50% | | |
| ENG | 25% | NST | 30% | | | | |
| UDT | 25% | | | | | | |
| TOTAL | 100% | | 120% | | 100% | | 140% |

It should be appreciated that the information extracted by the state matrix determination unit 220 from the setup data and the state data provided by the interface 210 may be obtained and stored in any appropriate format, wherein the unit 220 may comprise any appropriate hardware and software resources, such as storage means, central processing units (CPU) and the like, that are appropriately configured to extract and store the corresponding state matrix.

The state estimation unit 280 may further comprise a state summation unit 230 that is configured to establish the respective capacity or weighting factor for each state or sub-state for each process step according to the configuration of the cluster tool 250. Corresponding weighted state data for each step of the tool 250 are illustrated in Table 2d, wherein regarding any hardware and software resources for extracting and storing the respective data contained in Table 2d, the same criteria may apply as previously explained with reference to the unit 220.

TABLE 2d

| | STEP | | | |
|---|---|---|---|---|
| State | 1 cap % | 2 cap % | 3 cap % | 4 cap % |
| PRD | 25% | 60% | 50% | 140% |
| SBY | 25% | 0% | 50% | 0% |
| ENG | 25% | 0% | 0% | 0% |
| SDT | 0% | 30% | 0% | 0% |
| UDT | 25% | 0% | 0% | 0% |
| NST | 0% | 30% | 0% | 0% |
| TOTAL | 100% | 120% | 100% | 140% |

The state estimation unit 280 may further comprise a state accumulation unit 240 that is configured to provide an "accumulated" weighting factor or capacity for the plurality of states for each step, wherein, as previously explained with reference to FIG. 2b, the accumulation may be performed on the basis of the hierarchy, as is for instance shown in Table 2a.

For the above-specified example, Table 2e schematically illustrates a corresponding accumulated state weight or capacity for each step of the cluster tool 250.

TABLE 2e

| State cap % accumulation by Step | 1 | 2 | 3 | 4 |
|---|---|---|---|---|
| PRD | 25% | 60% | 50% | 140% |
| PRD + SBY = | 50% | 60% | 100% | 140% |
| PRD + SBY + ENG = | 75% | 60% | 100% | 140% |
| PRD + SBY + ENG + SDT = | 75% | 90% | 100% | 140% |
| PRD + SBY + ENG + SDT + UDT = | 100% | 90% | 100% | 140% |
| PRD + SBY + ENG + SDT + UDT + SNT = | 100% | 120% | 100% | 140% |

As is evident from Table 2e, the weights or capacities of the respective states are summed up in each step according to the ranking of each of the states.

The state estimation unit 280 may further comprise a state minimum determination unit 260, which may be configured to identify the minimum weight or capacity for each of the accumulated states when considering all steps of the cluster tool 250. The corresponding minima provided by the unit 260 are represented in Table 2f.

TABLE 2f

| MIN | State cap % accumulation |
|---|---|
| 25% | PRD |
| 50% | PRD + SBY |
| 60% | PRD + SBY + ENG |
| 75% | PRD + SBY + ENG + SDT |
| 90% | PRD + SBY + ENG + SDT + UDT |
| 100% | PRD + SBY + ENG + SDT + UDT + NST |

As is evident from Table 2f, the accumulated state PRD is represented by a weight or capacity of 25%, since this is the minimum weight or capacity for this state in all steps 1-4 with respect to Table 2e. Similarly, for the accumulated state PRD plus SBY, the minimum weight or capacity is 50%, corresponding to the minimum value for this state provided in step 1 according to Table 2e. For the accumulated state PRD plus SBY plus ENG, a minimum value of 60% is determined by the unit 260, which corresponds to the respective value of step 2. Similarly, for the accumulated state PRD plus SBY plus ENG plus SDT, a value of 75% has been determined, which corresponds to the respective value in the first step of Table 2e. The value of 90% for the accumulated state PRD plus SBY plus ENG plus SDT plus UDT corresponds to step 2 and finally the accumulated state PRD plus SBY plus ENG plus SDT plus UDT plus NST has a value of 100% representing the minimum of steps 1-4, for instance step 1 or step 3 of Table 2e.

Moreover, the state estimation unit 280 may further comprise a state redistribution unit 270, which is adapted to assign appropriate weighting factors or capacities to each of the respective states PRD, SBY, ENG, SDT, UDT and NST, which in combination represent the total state of the cluster tool 250. As previously explained with reference to FIG. 2b and the corresponding hierarchy, the respective influences may be assigned to the individual states in such a way that the total state represents a normalized state, i.e., representing 100% of the cluster tool state with corresponding sub-states having the correspondingly determined weighting factors or capacities. Table 2g illustrates the respective weighting factors for the corresponding cluster sub-states which may be obtained by determining respective differences of subsequent accumulated states represented in Table 2f.

TABLE 2g

| CLUSTER STATE | |
|---|---|
| PRD | 25% |
| SBY | 25% |
| ENG | 10% |
| SDT | 15% |
| UDT | 15% |
| NST | 10% |
| TOTAL | 100% |

Consequently, the state estimation unit 280 may provide a quantitative measure of the state of the cluster tool 250 as a mixture of weighted sub-states, which, in one illustrative embodiment, may be represented by standard E10 entity states. The cluster state provided by the state redistribution unit 270 may then be used for the measurement or determination of further tool characteristics, such as reliability, availability and maintainability. For this purpose, the system 200 may provide the respective values representing the cluster tool state to an external source via the interface 210 or, in other illustrative embodiments, the state estimation unit 280 may be further configured to determine a metric for a respective tool characteristic on the basis of the cluster state. As previously explained, the corresponding state data provided by the tool 250 and received by the interface 210 may be gathered in any appropriate temporal sequence, wherein the corresponding cluster tool state may be determined for each version of updated data provided by the tool 250, or, in other embodiments, the respective updated cluster tool states may be determined as soon as a state change in one of the entities of the cluster tool 250 is detected by the system 200. For example, in one illustrative embodiment, the system 200 may be configured to compare the state of the tool 250 with a previously valid state, which may, for instance, be accomplished by correspondingly comparing the state matrices provided by the unit 220 so that a corresponding updated tool state for the cluster tool 250 may then be determined whenever the unit 220 detects a difference of two subsequently determined state matrices. It should be appreciated that the corresponding determination of the currently valid tool state be performed in a real-time manner or may be performed at any appropriate point in time, as long as the interface 210 and/or the state estimation unit 280 may receive the corresponding state data or process messages with a predefined frequency, wherein the corresponding data may be processed immediately or in any delayed fashion according to computational resources of the state estimation unit 280. Consequently, the dynamic behavior of the state of the tool 250 and thus the corresponding metrics for the tool characteristics may be determined on the basis of the temporal development of the tool state of the cluster tool 250.

Figure 2D:
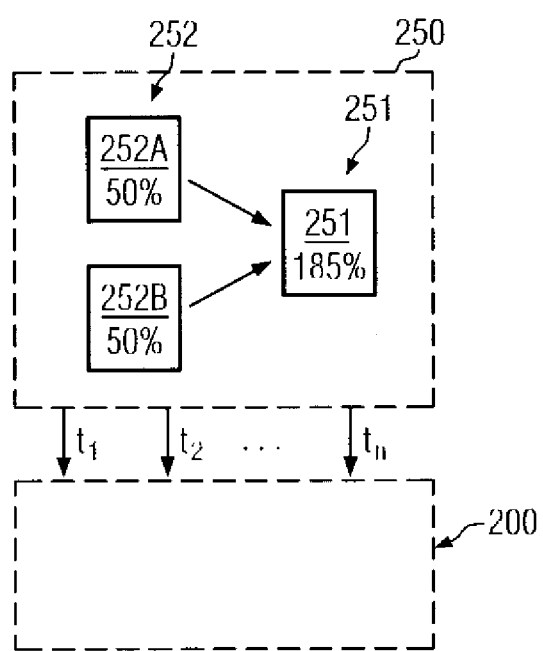
FIG. 2d schematically illustrates a cluster tool communicating with the system as shown in FIG. 2c so as to estimate the temporal behavior of the cluster tool in accordance with illustrative embodiments of the present invention.

FIG. 2d schematically illustrates a very simple cluster tool in order to present a comprehensive example for the dynamic development of a cluster tool state, thereby indicating that any quantitative assessment with respect to tool characteristics, such as the time period for which the cluster tool was in one of a respective sub-state, may be obtained as a summation over all various total cluster tool states within a specified time period. In FIG. 2d, a cluster tool which is also indicated as tool 250, may comprise two processing entities 252, operating in parallel and having the same performance, and a transport and handling or mainframe entity 251. Consequently, the tool 250 may be classified by two steps, wherein the first step has a capacity of 100%, since the transport and handling 251 may have an increased capacity, such as 185%. The cluster tool 250 may be connected to the system 200 to provide respective process messages for a plurality of points in time $t_1 \ldots t_n$ so that the system 200 may calculate the respective cluster tool states for the respective time slots represented by $t_1 \ldots t_n$. For simplicity, it may be assumed that any changes in state in one of the entities of the tool 250 may occur at each hour so that for each hour a corresponding updated cluster tool state is determined. It may be assumed that, for the time slots represented by the times $t_1 \ldots t_n$, the entities 252A, 252B and 251 of the cluster tool 250 may have the respective entity state as illustrated in Table 2h.

TABLE 2h

| 251 | 252A | 252B | 250 PRD | 250 SBY | 250 ENG | 250 SDT | 250 UDT | 250 NST | Time |
|---|---|---|---|---|---|---|---|---|---|
| PRD | PRD | PRD | 1.0 | | | | | | $t_1$ 1.0 |
| PRD | PRD | ENG | 0.5 | | 0.5 | | | | $t_2$ 1.0 |
| PRD | UDT | PRD | 0.5 | | | | 0.5 | | |
| PRD | PRD | SDT | 0.5 | | | 0.5 | | | |
| SBY | UDT | SDT | | | | 0.5 | 0.5 | | |
| SBY | ENG | UDT | | | 0.5 | | 0.5 | | |
| ENG | SBY | SDT | | | 0.5 | 0.5 | | | |
| UDT | ENG | SBY | | | | | 1.0 | | |
| SBY | ENG | SDT | | | 0.5 | 0.5 | | | |
| ENG | PRD | NST | | | 0.5 | | | 0.5 | |
| ENG | PRD | NST | | | 0.5 | | | 0.5 | |
| SBY | UDT | SBY | | 0.5 | | | 0.5 | | $T_{12}$ 1.0 |
| TOTAL | | | 2.5 | 0.5 | 3.0 | 2.0 | 3.0 | 1.0 | 12.0 |

For example, during time $t_1$, all the entities of the tool 250 are in the productive state, resulting in 100% productivity for the tool 250, as is indicated on the left hand side of Table 2h. Similarly, during time $t_2$, the entity 252B is in the ENG state, resulting in a total state for the tool 250 of 50% productive and 50% engineering so that the corresponding time period for the productive state is 0.5 hours and correspondingly the time period for the engineering state of the tool 250, when considered as a single entity, is 0.5 hours. It should be appreciated that the respective values for the individual sub-states, which in combination represent the state of the tool 250 when considered as an entity, may be derived according to the procedure as previously described with reference to FIG. 2c. Thus, after, for instance, twelve time slots, a resulting total state may be determined by integrating or summing over the individual total states, thereby providing respective metrics for the individual sub-states of the cluster tool 250. In the present example, for a time period of 12 hours, the tool 250 may have been 2.5 hours in the productive state, 0.5 hour in the standby state, 3.0 hours in the engineering state, 2.0 hours in the schedule down state, 3.0 hours in the unscheduled down state, 1.0 hour in the non-scheduled state.

In a further illustrative embodiment, the system 200 as shown in FIG. 2d may further be configured to include a failure count approximation for the cluster tool 250. As previously explained, the plurality of states in which each individual entity of the cluster tool 250 may be are appropriately weighted to provide a combined cluster tool state, wherein the weighting factor may represent the corresponding influence of the respective entity state on the total cluster state. Since the respective metrics obtained by the weighted entity states may be used for the determination of tool characteristics, such as reliability, availability, maintainability on the basis of corresponding processes as may also be used for the corresponding determination of tool characteristics of single entities, corresponding tool failures may be weighted in a similar fashion as the individual entity states. For example, the state UDT representing an unscheduled downtime is typically associated with a respective failure of the tool. Consequently, if the UDT state has a specific weight for defining the total cluster tool state, a corresponding weighting factor may also be assigned to a respective tool failure, which may then yield comprehensive and consistent metrics for tool characteristics, such as reliability, which may be represented by the metric mean time to repair (MTTR) or mean productive time between failure (MTBF). In one illustrative embodiment, the failure count associated with the UDT state may be weighted by a corresponding weighting factor representing the capacity loss upon occurrence of a corresponding failure.

Figure 2E:
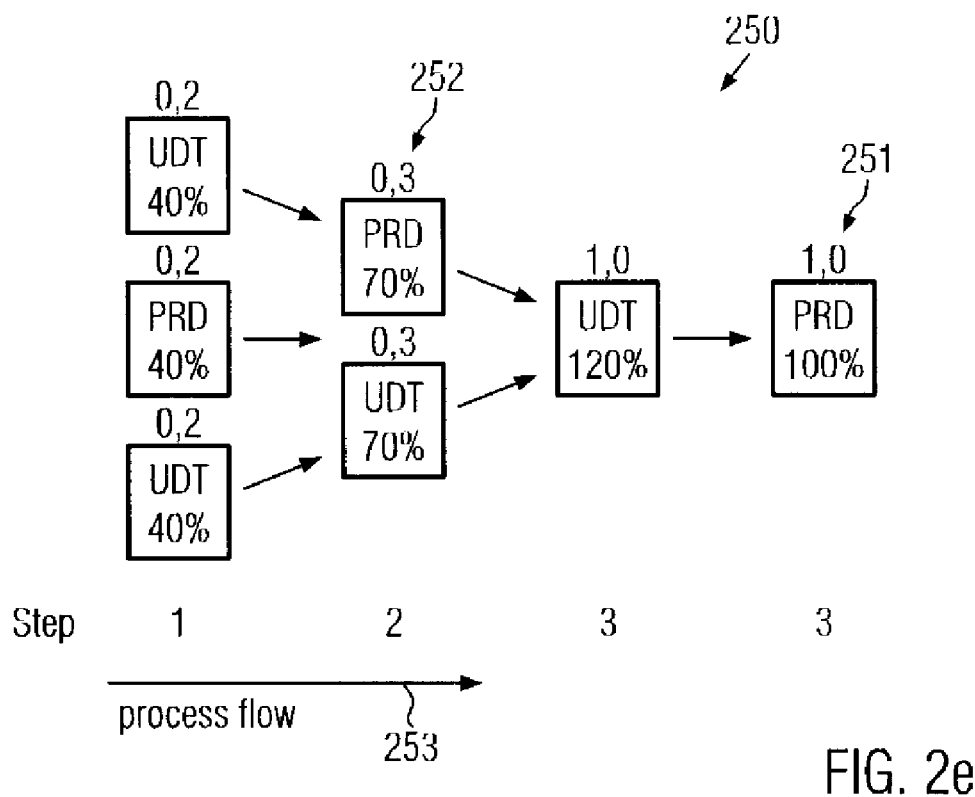
FIG. 2e illustrates in an upper portion an illustrative representation of a cluster tool including a plurality of capacity weighted entities with respective failure weighting factors and with an assumed failure distribution within a given time period according to illustrative embodiments of the present invention.

FIG. 2e schematically shows a cluster tool 250 having a plurality of entities 252 and a transport and handling entity 251, wherein the corresponding process flow of the cluster tool 250 is represented by four steps, wherein the individual entities 252 and 251 of the respective steps are given respective weighting factors on the basis of, for instance, performance capacity, as is also explained with reference to FIG. 2a. In the example shown, the entities 252 defining step 1 of the tool 250 may perform identical processes and may have a total capacity of 120%, the corresponding entities 252 defining the second step may have a total capacity of 140%, while the single entity 252 defining the third step may have the capacity of 120%. In the example shown, the transport and handling entity 251 may define the fourth step and may represent the "bottleneck" of the cluster tool 250, thereby representing the 100% reference. In a specific point in time, the individual entities 252, 251 may be in the respective states as indicated in FIG. 2e, so that, for instance in step 1, two entities are in the UDT state, in the second step, one entity is in the UDT state and also in the third step, the respective entity is in the UDT state. Moreover, as previously explained, a corresponding UDT state indicates an entity failure, wherein the respective failures may not simply be added so as to provide a failure count of the tool 250 when considered as an entity, but the individual failures may be weighted by the respective weighting factors as are also indicated in FIG. 2e. For instance, in step 1, the failure of one entity 252 may result in a capacity loss of 20% with respect to the 100% of the tool 250, since the total capacity of the entities in step 1 is 120%. Consequently, the respective weighting factor for a corresponding failure may be set to 20% or 0.2. Similarly, a failure weighting factor in step 2 may be selected to 30% or 0.3, since a failure in one of the two entities 252 of step 2 may result in a capacity loss of 30% of the 100% capacity of the tool 250.

Furthermore, respective weighting factors for entities steps 3 and 4 may be set to 100% or 1.0, since a failure in one of these entities reduces the resulting tool capacity to 0. Consequently, during a specified period of time represented by the entity states as indicated in FIG. 2e, four individual failures occurred, that is, two failures in the first step, one failure in the second step and one failure in the third step. In one illustrative embodiment, the corresponding weighted failures may be calculated on the basis of the individual weighting factors, thereby disregarding any additional capacity losses caused by the simultaneous occurrence of any failures in one of the steps 1-4. For example, in the example shown, each of the failures in step 1 may be weighted by 0.2, thereby resulting in an overall weighted failure count of 0.4 for step 1. Similarly, the single failure in step 2 is weighted by 0.3, while the single failure in step 3 is weighted by 1.0, thereby resulting in an overall failure count of 1.7.

In other embodiments, the simultaneous occurrence of failures may be appropriately taken into consideration by correspondingly redefining the weighting factors. For example, a simultaneous occurrence of the failures in step 1 may result in a capacity loss of 60% so that the corresponding weighting factor should be 0.6 for the simultaneous occurrence of two failures in step 1 instead of 0.4 as the sum of the individual failure weights. In some illustrative embodiments, the determination of the failure weights may be performed on the basis of weighting factors that are established in correspondence with the temporal occurrence of the respective failure states so that, for instance, for an overlapping time period with a simultaneous occurrence of two or more failure states, the weighting factor may be adapted and may then be re-adjusted when one or more of the failure states have elapsed while one or more of the other failure states may still be present. Consequently, highly consistent failure counts may be established for the cluster tool 250 to more precisely determine respective tool characteristics, which are based on a total failure count for the respective cluster tool. For example, in conventional techniques as previously described with reference to FIGS. 1a-1b, respective entity failures are simply added, thereby resulting in non-comprehensive metrics for respective tool characteristics, such as reliability and the like, in which the failure count is used for assessing the tool characteristics.

Figure 1B:
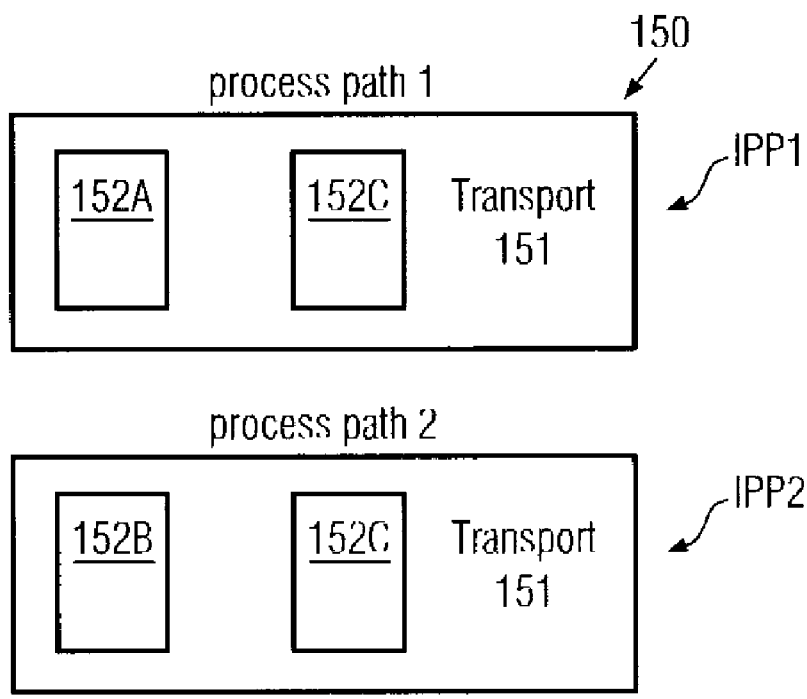
FIG. 1b schematically illustrates the configuration of the cluster tool shown in FIG. 1a according to a conventional technique, thereby defining respective intended process paths as tool entities.
Figure 2F:
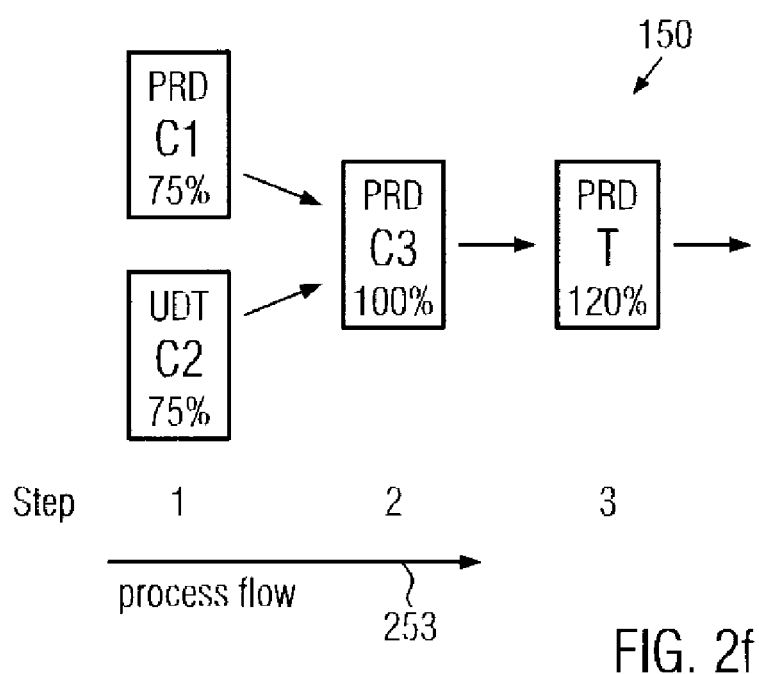
FIG. 2f schematically illustrates the cluster tool of FIG. 1a, in which the corresponding entities are represented as capacity weighted entities in accordance with illustrative embodiments of the present invention.

FIG. 2f schematically illustrates a cluster tool, such as the cluster tool 150 as shown in FIG. 1a, wherein the virtual configuration of the tool 150 is obtained in accordance with the principles of one illustrative embodiment of the present invention, wherein capacity weighted entity states are provided. In order to compare the results obtained by the present invention with corresponding results as previously described for the tool 150, a respective configuration described by the truth table 1c may be selected, wherein the entity 152A is up, the entity 152B is down, the entity 152C is up and the transport 151 is up, resulting in IPP1 being up and IPP2 being down. In FIG. 2f, the tool 150 is illustrated with three steps, wherein the respective capacity weights are selected, since corresponding values may not be available from the conventional examples. Based on the respective weighting factor, the corresponding procedure for obtaining a state matrix, performing a corresponding summation of capacity weights per state and step, determining respective capacities for accumulated states, selecting a minimum capacity weight for each accumulated state and finally determining the respective influences on the total cluster state by redistributing the corresponding weighting factors, as is explained in detail with reference to FIG. 2c, may also be applied to the tool 150 as illustrated in FIG. 2f. Consequently, the following cluster state may be obtained: PRD 75%, SBY 0%, ENG 0%, SDT 0%, UDT 25% and NST 0%. Based on the up times and down times of 100 hours and 140 hours for IPP1 and IPP2, a respective operating scheme may be assumed as is represented in Table 2i.

TABLE 2i

| 152A | 152c | 151 | IPP1 | TIME | 152b | 152c | 151 | IPP2 | TIME |
|---|---|---|---|---|---|---|---|---|---|
| SBY | UDT | UDT | DOWN | 14.0 | UDT | UDT | UDT | DOWN | 14.0 |
| PRD | PRD | PRD | UP | 12.0 | PRD | PRD | PRD | UP | 12.0 |
| SBY | UDT | SBY | DOWN | 14.0 | ENG | UDT | SBY | DOWN | 14.0 |
| PRD | PRD | PRD | UP | 48.0 | PRD | PRD | PRD | UP | 48.0 |
| UDT | PRD | PRD | DOWN | 40.0 | PRD | PRD | PRD | UP | 40.0 |
| PRD | PRD | PRD | UP | 40.0 | PRD | PRD | PRD | UP | 40.0 |
|  |  |  | UP | 100.00 |  |  |  | UP | 140.0 |
|  |  |  | DOWN | 68.0 |  |  |  | DOWN | 28.0 |
|  |  |  | TOTAL | 168.0 |  |  |  | TOTAL | 168.0 |

As previously illustrated, the corresponding process sequence may result in an uptime of 71.4% and a corresponding downtime of 28.6% for the tool 150 when considered as an entity according to the conventional technique. As is evident from Table 2i, one failure occurs in entity 152A, two failures may occur in entity 152C and one failure may occur in the transport, while one failure also occurs in entity 152B. Consequently, as previously explained, the mean time between failures is 76.0 hours with a total of five failures. Contrary to these values, determining the respective cluster tool states for the respective time slots as indicated by Table 2i, i.e., applying the above-specified procedure according to illustrative embodiments for each time slot and accumulating the respective cluster tool states, as is previously explained with reference to FIG. 2c, the following metrics for the individual sub-states comprising the state of the tool 150 are obtained: PRD 130.0 hours, SBY 0.0 hours, ENG 0.0 hours, SDT 0.0 hours, UDT 38.0 hours and NST 0.0 hours. Consequently, a productive time, i.e., an uptime, of 77.4% is obtained, while the downtime, in this case an unscheduled downtime, is 22.6%.

Furthermore, the corresponding weighting factors for any failures in step 1 are 0.25, while the respective weighting factors in step 2 and step 3 are 1.0. Consequently, the weighted failure count, i.e., failures in step 1 each having a failure weight of 0.25, two failures in step 2 with a failure weight of 1.0 and one failure in step 3 with a failure weight of 1.0 yields a weighted failure count of 3.5. Consequently, corresponding metrics indicating reliability, such as MTBF, MUTBF (mean uptime between failure) and MTTR may be determined, thereby yielding: MTBF (productive time/failure count) 37.14 hours, MUTBF (uptime/failure count) 37.14 hours and MTTR (downtime/failure count) 10.86 hours.

For example, the corresponding mean time before failure determined on the basis of the conventional technique yields 76.0 hours, thereby also indicating a significant deviation to the corresponding results according to the present invention. Moreover, a high degree of consistency of the results of the present invention is indicated by evaluating the availability defined by 1-(MTTR/(MTTR+MUTBF)), yielding 0.774, which is identical to the uptime of 77.4% previously obtained.

As a result, the present invention provides an enhanced technique for measuring and monitoring cluster tool states, thereby providing the potential for measuring tool characteristics, such as reliability, availability and maintainability, wherein, in some illustrative embodiments, standard E10 states may be used for representing a corresponding cluster tool state. For this purpose, weighted entity states may be combined to provide a representation of the cluster tool state, wherein a respective combination, that is aggregation or accumulation of entity states, may be performed on the basis of an appropriately defined hierarchy structure of the entity states. Furthermore, in some illustrative embodiments, respective failures indicated by corresponding entity states may also be weighted on the basis of appropriate weighting factors, thereby providing a high degree of consistency in view of numerical values of tool characteristics. In one illustrative embodiment, the weighting factor may be determined on the basis of the capacity of the individual entities, wherein the capacity may be determined on any appropriate performance data, such as averaged cycle times for a plurality of operations, supplier-specific data or the corresponding capacity values may be dynamically adapted depending on operating conditions. Moreover, any number of sub-states may be handled by the systems and methods provided herein, while in conventional techniques only up and down states may be used. For the cluster description of the conventional technique, a truth table with up to $2^n$ rows for a cluster tool with n entities may be required, whereas the present invention may use a setup matrix with n rows only. Furthermore, the present invention may take into consideration the capacity surplus of parallel entities in favor of the cluster tool, that is, two parallel chambers with 70% capacity result in a capacity loss of 30% when one of the chambers fails, wherein, in the conventional technique, a capacity loss of 50% is used. Consequently, a high degree of comprehensiveness with respect to the representation of a cluster tool in combination with a modest effort in cluster matrix modeling may be achieved, wherein measurement of availability, reliability and maintainability may result in more accurate metrics compared to conventional techniques.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving process messages from a cluster tool used in a manufacturing process line via an interface communicating with said cluster tool, said cluster tool comprising a plurality of entities, wherein said process messages comprise tool-specific information specifying one of a plurality of available states for each of said entities;

automatically determining a metric for a current total state of said cluster tool on the basis of a functional capacity of each entity and said process messages, wherein said plurality of available states comprises a productive state, a standby state, an engineering state, a scheduled down state, an unscheduled down state and a non-scheduled state, and wherein said plurality of available states are ranked in a hierarchy, and wherein said hierarchy has a ranking of said plurality of available states in the following order from lowest to highest priority: a productive state, a standby state, an engineering state, a scheduled down state, an unscheduled down state and a non-scheduled state.

2. The method of claim 1, wherein said metric of said current total state of the cluster tool is a set of values, each value being associated with a respective one of said available states and representing a weighted contribution of said respective one available state to said current total state.

3. The method of claim 1, further comprising measuring at least one of reliability, availability and maintainability on the basis of said metric of the current total state.

4. The method of claim 1, further comprising determining an updated metric for said total state for an operation time interval defined by a state change of at least one entity.

5. A method, comprising:

receiving process messages from a cluster tool used in a manufacturing process line via an interface communicating with said cluster tool, said cluster tool comprising a plurality of entities:

automatically determining a metric for a current total state of said cluster tool on the basis of a functional capacity of each entity and said process messages; and defining a weighted capacity for each of said plurality of entities, wherein an entity having the lowest capacity is used as a reference.

6. The method of claim 5, wherein said weighted capacity for each entity is determined on the basis of a cycle time for a specified process in each entity and the number of substrates simultaneously processed in each entity.

7. The method of claim 6, further comprising dynamically updating said cycle time on the basis of said process messages.

8. A method, comprising:

receiving process messages from a cluster tool used in a manufacturing process line via an interface communicating with said cluster tool, said cluster tool comprising a plurality of entities:

automatically determining a metric for a current total state of said cluster tool on the basis of a functional capacity of each entity and said process messages; and defining a setup matrix for said cluster tool, said setup matrix comprising a row for each entity and columns for process steps and a weighted capacity for each of said plurality of entities, said process steps determining a process flow through said cluster tool.

9. The method of claim 8, further comprising defining a hierarchy of said plurality of available states and using said hierarchy for determining said metric of said total state.

10. The method of claim 9, wherein said hierarchy has a ranking of said plurality of available states in the following order from lowest to highest priority: a productive state, a standby state, an engineering state, a scheduled down state, an unscheduled down state and a non-scheduled state.

\* \* \* \* \*